United States Patent
Higashimachi

(10) Patent No.: US 9,944,242 B2
(45) Date of Patent: Apr. 17, 2018

(54) VEHICLE BUMPER STRUCTURE EQUIPPED WITH PEDESTRIAN COLLISION DETECTION SENSOR

(71) Applicant: TOYOTA JIDOSHA KABUSHIKI KAISHA, Toyota-shi, Aichi (JP)

(72) Inventor: Naoya Higashimachi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 15/117,271

(22) PCT Filed: Jan. 16, 2015

(86) PCT No.: PCT/JP2015/051135
§ 371 (c)(1),
(2) Date: Aug. 8, 2016

(87) PCT Pub. No.: WO2015/118925
PCT Pub. Date: Aug. 13, 2015

(65) Prior Publication Data
US 2016/0347270 A1    Dec. 1, 2016

(30) Foreign Application Priority Data

Feb. 10, 2014  (JP) ................................. 2014-023596

(51) Int. Cl.
*B60R 19/48* (2006.01)
*B60R 19/18* (2006.01)
(Continued)

(52) U.S. Cl.
CPC .............. *B60R 19/48* (2013.01); *B60R 19/04* (2013.01); *B60R 19/18* (2013.01); *B60R 19/22* (2013.01);
(Continued)

(58) Field of Classification Search
CPC ......... B60R 19/48; B60R 19/04; B60R 19/18; B60R 19/22; B60R 19/483
(Continued)

(56) References Cited

U.S. PATENT DOCUMENTS 8,991,903 B1 * 3/2015 Alavandi ................ B60R 19/04
                                                293/133
2007/0200692 A1 * 8/2007 Kamel ...................... G01L 1/16
                                                340/436
(Continued)

FOREIGN PATENT DOCUMENTS

DE    202011105867      * 12/2011
DE    102012105562 A1    1/2013
(Continued)

OTHER PUBLICATIONS

Feb. 17, 2017 Search Report issued in European Patent Application No. 15747047.7.

*Primary Examiner* — Joseph D. Pape
(74) *Attorney, Agent, or Firm* — Oliff PLC

(57) ABSTRACT

At a front bumper, supporting members that are bodies separate from a bumper RF are assembled to vehicle transverse direction both end portions of the bumper RF, and the supporting members extend from vehicle transverse direction both ends of the bumper RF toward vehicle transverse direction outer sides and a vehicle rear side. Further, the supporting members are disposed adjacent to vehicle rear sides of absorber side portions and pressure tube side portions.

19 Claims, 9 Drawing Sheets

(51) Int. Cl.
*B60R 19/04* (2006.01)
*B60R 19/22* (2006.01)

(52) U.S. Cl.
CPC .... *B60R 19/483* (2013.01); *B60R 2019/1873* (2013.01)

(58) Field of Classification Search
USPC ......... 296/187.09, 187.1; 293/120, 102, 154, 293/117
See application file for complete search history.

(56) References Cited

U.S. PATENT DOCUMENTS

| | | | |
|---|---|---|---|
| 2009/0108598 A1 | | 4/2009 | Takahashi |
| 2009/0322107 A1 | * | 12/2009 | Takahashi ........... B60R 21/0136 293/121 |
| 2013/0127190 A1 | * | 5/2013 | Shamoto ................ B60R 19/18 293/117 |

FOREIGN PATENT DOCUMENTS

| | | |
|---|---|---|
| EP | 2 559 597 A1 | 2/2013 |
| JP | 2007-069707 A | 3/2007 |
| JP | 2007-216804 A | 8/2007 |
| JP | 2011-245910 A | 12/2011 |
| JP | 2013-023027 A | 2/2013 |
| JP | 2015-030323 A | 2/2015 |
| WO | 2011128971 A1 | 10/2011 |
| WO | 2012/113362 A1 | 8/2012 |

* cited by examiner

FIG.5
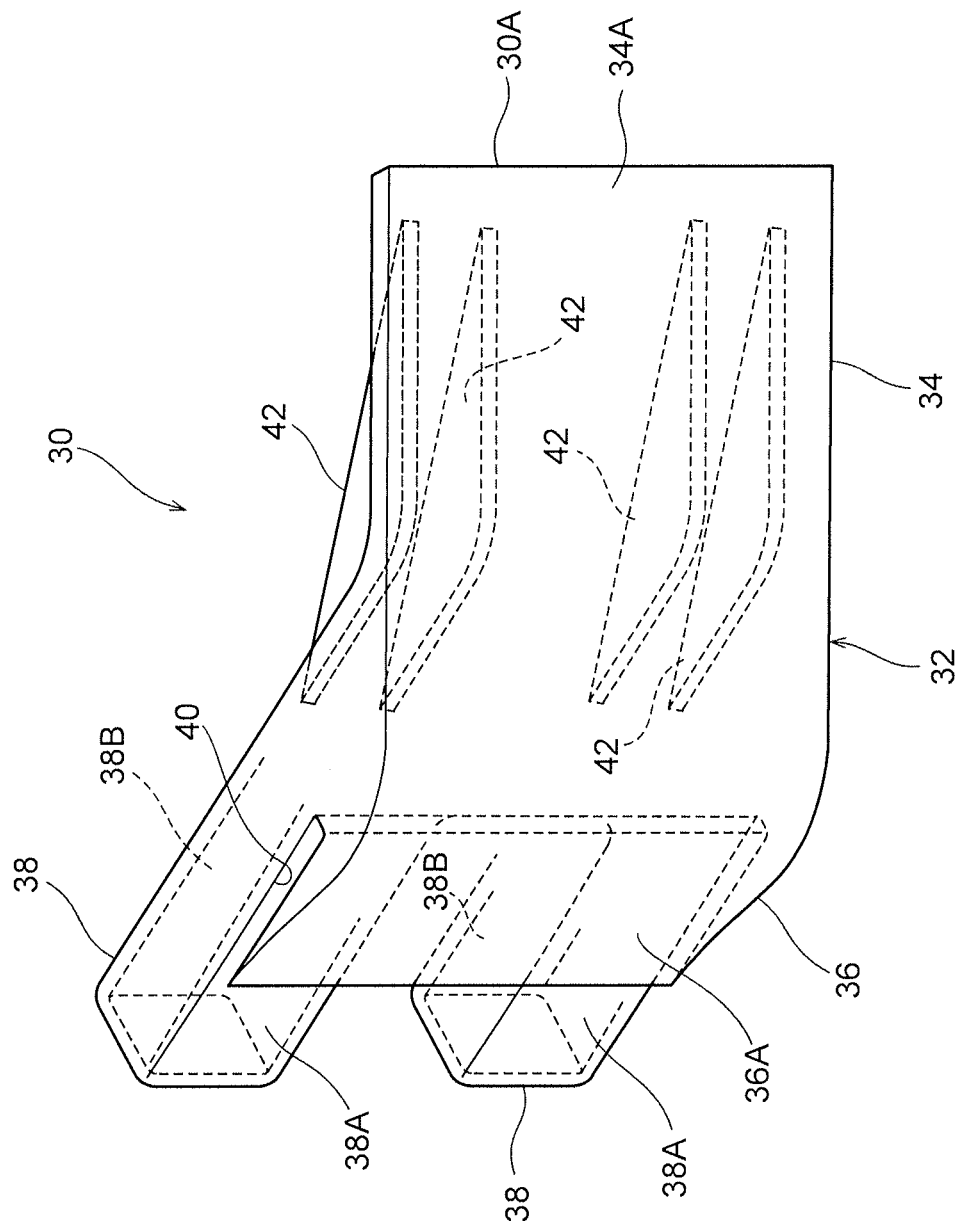
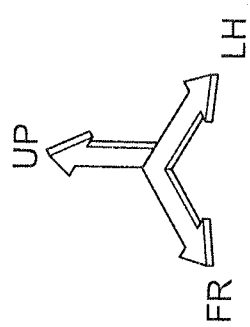

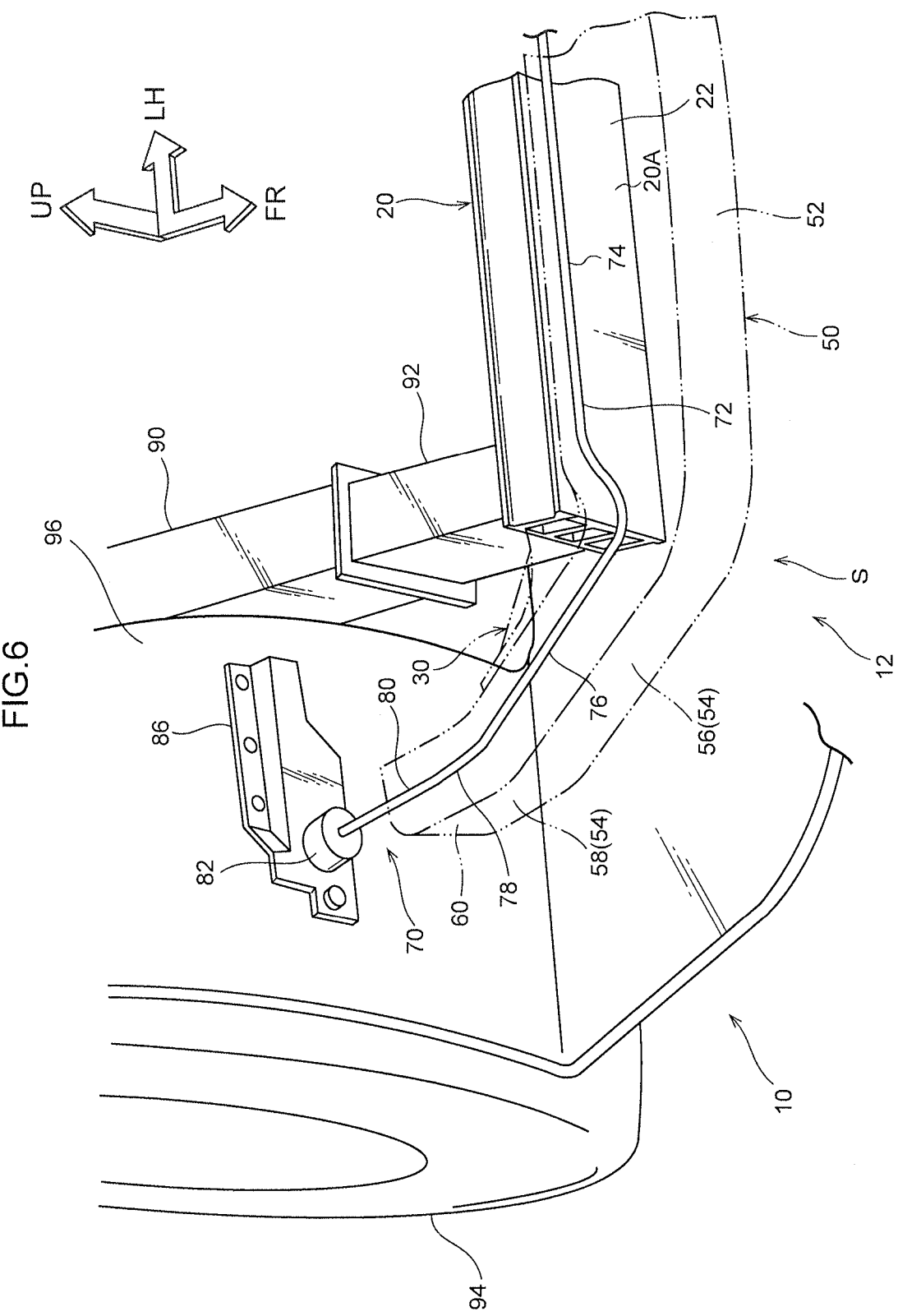

AMOUNT OF CRUSHING

VEHICLE TRANSVERSE DIRECTION
POSITION OF PRESSURE TUBE

AMOUNT OF CRUSHING

VEHICLE TRANSVERSE DIRECTION
POSITION OF PRESSURE TUBE

VEHICLE BUMPER STRUCTURE EQUIPPED WITH PEDESTRIAN COLLISION DETECTION SENSOR

TECHNICAL FIELD

The present invention relates to a vehicle bumper structure that is equipped with a pedestrian collision detection sensor.

BACKGROUND ART

In the vehicle bumper structure that is equipped with a pedestrian collision detection sensor disclosed in following International Publication (WO) No. 2012/223362, a pressure tube is provided between a bumper reinforcement and an absorber, and the pressure tube extends along the vehicle transverse direction. This pressure tube is assembled to (fit within) a groove that is formed in the absorber. When the absorber presses the pressure tube toward the vehicle rear side at the time of a collision of the vehicle and a collision body, reaction force with respect to the pressure tube is applied from the bumper reinforcement, and the pressure tube deforms. Due thereto, a pressure sensor outputs a signal corresponding to the change in pressure of the pressure tube, and an ECU discriminates whether or not the collision body that collided with the vehicle is a pedestrian. As vehicle bumper structures that are equipped with a pedestrian collision detection sensor, there are also the structures disclosed in Japanese Patent Application Laid-Open (JP-A) No. 2007-069707, WO2011/128971, and JP-A No. 2011-245910.

SUMMARY OF THE INVENTION

Technical Problem

In a case in which the bumper reinforcement is disposed at the vehicle rear side with respect to the corner portions of the vehicle, the vehicle transverse direction both end portions of the bumper reinforcement must be bent toward the vehicle rear side in correspondence with the corner portions of the vehicle.

However, in the bending processing of the bumper reinforcement, there is the limitation in terms of the processing that bending processing of greater than or equal to a predetermined angle cannot be carried out. Therefore, in a vehicle at which the incline at the corner portions of the vehicle with respect to the vehicle transverse direction is large, there are cases in which the vehicle transverse direction both end portions of the bumper reinforcement cannot be bent. Due thereto, at such a vehicle, a structure will be employed in which the bumper reinforcement is not disposed at the vehicle rear side with respect to the corner portions of the vehicle. Since there is no member that generates reaction force with respect to the pressure tube at the time of a collision of the vehicle with a collision body, at the corner portions of the vehicle, whether or not there is a collision body that collides with the vehicle cannot be detected.

In view of the above-described circumstances, an object of the present invention is to provide a vehicle bumper structure that is equipped with a pedestrian collision detection sensor, that can detect a collision with a collision body at a corner portion of a vehicle.

Solution to Problem

A vehicle bumper structure that is equipped with a pedestrian collision detection sensor and relates to a first aspect includes: a bumper reinforcement that is disposed with a vehicle transverse direction being a length direction thereof; an absorber that extends in the vehicle transverse direction, and that is disposed adjacent to a vehicle longitudinal direction outer side of the bumper reinforcement; a pedestrian collision detection sensor that includes a pressure tube extending in the vehicle transverse direction between the bumper reinforcement and the absorber, the pedestrian collision detection sensor being configured to output a signal corresponding to a change in pressure of the pressure tube; and supporting members that are structured by members separate from the bumper reinforcement, and that extend from both vehicle transverse direction end portions of the bumper reinforcement toward vehicle transverse direction outer sides and toward a vehicle longitudinal direction inner side as seen in plan view, the supporting members being disposed adjacent to a vehicle longitudinal direction inner side of the absorber and of the pressure tube.

In the vehicle bumper structure that is equipped with a pedestrian collision detection sensor according to the first aspect, the bumper reinforcement is disposed with the vehicle transverse direction being the length direction thereof. The absorber is disposed adjacent to the vehicle longitudinal direction outer side of the bumper reinforcement (the vehicle front side at a bumper reinforcement that is disposed at the vehicle front portion, and the vehicle rear side at a bumper reinforcement that is disposed at the vehicle rear portion), and the absorber extends in the vehicle transverse direction. Further, the pressure tube of the pedestrian collision detection sensor extends in the vehicle transverse direction, between the bumper reinforcement and the absorber.

Here, the supporting members that are structured by members separate from the bumper reinforcement respectively extend toward the vehicle transverse direction outer sides and the vehicle longitudinal direction inner side from the vehicle transverse direction both end portions of the bumper reinforcement, as seen in plan view. Further, the supporting members are disposed adjacent to the vehicle longitudinal direction inner sides of the absorber and the pressure tube.

Therefore, even in a case in which the bumper reinforcement cannot be disposed at the vehicle longitudinal direction inner side with respect to the corner portions of the vehicle due to limitations in processing or the like, the absorber and the pressure tube can be supported from the vehicle longitudinal direction inner side by the supporting members. Due thereto, at the time of a collision of the vehicle with a collision body, reaction force with respect to the pressure tube may be generated by the supporting members. Accordingly, a collision with a collision body at a corner portion of the vehicle may be detected.

A vehicle bumper structure that is equipped with a pedestrian collision detection sensor according a second aspect is configured such that, in the first aspect, both vehicle transverse direction end portions of the absorber and both vehicle transverse direction end portions of the pressure tube are disposed further toward vehicle transverse direction outer sides than distal ends of the supporting members.

In the vehicle bumper structure that is equipped with a pedestrian collision detection sensor according to the second aspect, the respective vehicle transverse direction both end portions of the absorber and the pressure tube are disposed further toward the vehicle transverse direction outer sides than the distal ends of the supporting members. Therefore, the detection range of the pedestrian collision detection sensor in the vehicle transverse direction may be configured to be large.

A vehicle bumper structure that is equipped with a pedestrian collision detection sensor according to a third aspect is configured such that, in the second aspect, a holding portion that holds the pressure tube is formed at the absorber, absorber side projecting portions are formed at both the vehicle transverse direction end portions of the absorber, the absorber side projecting portions projecting out toward a vehicle longitudinal direction inner side with respect to the distal ends of the supporting members and extending in a vehicle longitudinal direction, and pressure tube side projecting portions are formed at both the vehicle transverse direction end portions of the pressure tube, the pressure tube side projecting portions extending in the vehicle longitudinal direction along the absorber side projecting portions.

In the vehicle bumper structure that is equipped with a pedestrian collision detection sensor according to the third aspect, the holding portion is formed at the absorber, and the pressure tube is held by the holding portion. Therefore, the pressure tube is held over the length direction of the absorber. Further, the absorber side projecting portions and the pressure tube side projecting portions project-out toward the vehicle longitudinal direction inner side with respect to the distal ends of the supporting members, and extend in the vehicle longitudinal direction. Therefore, when a collision body collides from a side of the vehicle, load toward the vehicle transverse direction inner side is inputted to the absorber side projecting portion and the pressure tube side projecting portion, and the absorber side projecting portion and the pressure tube side projecting portion deform toward the vehicle transverse direction inner side. Due thereto, a collision body that collides from a side of the vehicle also may be detected. Accordingly, collisions with bicycles that mainly tend to collide from a side of the vehicle may be detected.

A vehicle bumper structure that is equipped with a pedestrian collision detection sensor according to a fourth aspect is configured such that, in any one aspect of the first aspect through the third aspect, the supporting members include curved surfaces that are disposed at a vehicle longitudinal direction outer side with respect to both the vehicle transverse direction end portions of the bumper reinforcement, and the curved surfaces are curved toward a vehicle longitudinal direction outer side so as to form surfaces that are continuous with a vehicle longitudinal direction outer side surface of the bumper reinforcement as seen in plan view.

In the vehicle bumper structure that is equipped with a pedestrian collision detection sensor according to the fourth aspect, a continuous surface is formed by the curved surfaces that are disposed at the vehicle longitudinal direction outer side with respect to the vehicle transverse direction both end portions of the bumper reinforcement, and the vehicle longitudinal direction outer side surface of the bumper reinforcement. Therefore, the pressure tube that extends in the vehicle transverse direction may be bent smoothly toward the vehicle longitudinal direction inner side by the curved surfaces. Due thereto, changes in pressure at the curved portions of the pressure tube becoming large may be suppressed. As a result, dispersion in changes in pressure of the pressure tube in the vehicle transverse direction may be suppressed, and the detection accuracy of the pedestrian collision detection sensor in the vehicle transverse direction may be made to be uniform.

A vehicle bumper structure that is equipped with a pedestrian collision detection sensor according to a fifth aspect is configured such that, in any one aspect of the first aspect through the fourth aspect, the supporting members are made of resin, and ribs, having a plate thickness direction in a vehicle vertical direction, are formed integrally with the supporting members.

In the vehicle bumper structure that is equipped with a pedestrian collision detection sensor according to the fifth aspect, the bending rigidity, toward the vehicle longitudinal direction inner side, of the supporting members that are made of resin may be made to be high. Due thereto, reaction force with respect to the pressure tube may be generated well at the time of a collision with a collision body.

A vehicle bumper structure that is equipped with a pedestrian collision detection sensor according to a sixth aspect is configured such that, in any one aspect of the first aspect through the fifth aspect, the bumper reinforcement is formed as a closed cross-sectional structure that opens toward both vehicle transverse direction sides, and the supporting members include fit-together portions that project out toward a vehicle transverse direction inner side, and the supporting members are assembled to the bumper reinforcement by fitting the fit-together portions to the closed cross-section of the bumper reinforcement.

In the vehicle bumper structure that is equipped with a pedestrian collision detection sensor according to the sixth aspect, the supporting members are assembled to the bumper reinforcements by fitting the fit-together portions of the supporting members in the closed cross-section of the bumper reinforcement. Therefore, the supporting members may be assembled to the bumper reinforcement by using the interior of the closed cross-section of the bumper reinforcement.

A vehicle bumper structure that is equipped with a pedestrian collision detection sensor according to a seventh aspect is configured such that, in the sixth aspect, slits that open toward a vehicle transverse direction inner side are formed in the supporting members at positions between the fit-together portions and the curved surfaces, and in a state in which the supporting members are assembled to the bumper reinforcement, a front wall of the bumper reinforcement is fitted into the slits.

In the vehicle bumper structure that is equipped with a pedestrian collision detection sensor according to the seventh aspect, in the state in which the supporting members are assembled to the bumper reinforcement, the front wall of the bumper reinforcement is fit into the interiors of the slits that are formed in the supporting members. Due thereto, the pressure tube may be protected by the supporting members from, for example, burrs or the like that arise at the vehicle transverse direction both ends of the bumper reinforcement. Due thereto, the ability to damage the pressure tube may be reduced.

A vehicle bumper structure that is equipped with a pedestrian collision detection sensor according to an eighth aspect is configured such that, in any one aspect of the first aspect through the seventh aspect, the absorber and the pressure tube are disposed adjacent to a vehicle longitudinal direction outer side of an upper portion of the bumper reinforcement.

In the vehicle bumper structure that is equipped with a pedestrian collision detection sensor according to the eighth aspect, a pedestrian, who falls on the hood of the vehicle at the time of a collision of the vehicle and the pedestrian, may be appropriately detected. Namely, in a collision between a vehicle and a pedestrian, the pedestrian tends to fall onto the hood of the vehicle, and, at this time, collision load is inputted mainly to the upper portion of the absorber. Due thereto, by placing the absorber and the pressure tube adjacent to the vehicle longitudinal direction outer side of the upper portion of the bumper reinforcement, a pedestrian who has fallen onto the hood of the vehicle may be appropriately detected.

A vehicle bumper structure that is equipped with a pedestrian collision detection sensor according to a ninth aspect is configured such that, in any one aspect of the first aspect through the eighth aspect, a bumper cover is provided at a vehicle longitudinal direction outer side of the absorber, the pedestrian collision detection sensor has pressure detectors that output signals corresponding to changes in pressure within the pressure tube, and the pressure detectors are fixed to vehicle side members that are made of metal and are disposed at a vehicle longitudinal direction inner side of the bumper cover.

In the vehicle bumper structure that is equipped with a pedestrian collision detection sensor according to the ninth aspect, the pressure detectors are fixed to vehicle side members that are made of metal and are disposed at the vehicle longitudinal direction inner side of the bumper cover. Therefore, the reliability of the pressure detectors may be improved. Namely, for example, even when a minor impact is applied to the bumper cover at a time other than when the vehicle is traveling, that impact being directly inputted to the pressure detectors may be suppressed. Moreover, for example, the pressure detectors being covered with water by rain water or snow or the like may be suppressed. Due to the above, the reliability of the pressure detectors may be improved.

A vehicle bumper structure that is equipped with a pedestrian collision detection sensor according to a tenth aspect is configured such that, in any one aspect of the first aspect through the ninth aspect, a thickness of portions of the absorber that are disposed adjacent to the supporting members is thinner than a thickness of a portion of the absorber that is disposed adjacent to the bumper reinforcement.

In the vehicle bumper structure that is equipped with a pedestrian collision detection sensor according to the tenth aspect, by setting the thickness of the absorber to be thin, it may be made easy to express changes in pressure within the pressure tube when the absorber presses the pressure tube. Therefore, the pressure sensitivity of the portions that are disposed adjacent to the supporting members at the pressure tube may be made to be high.

A vehicle bumper structure that is equipped with a pedestrian collision detection sensor according to an eleventh aspect is configured such that, in any one aspect of the first aspect through the tenth aspect, a hardness of at least portions of the absorber that are disposed adjacent to the supporting members is higher than a hardness of other portions of the absorber.

In the vehicle bumper structure that is equipped with a pedestrian collision detection sensor and relates to the eleventh aspect, by setting the hardness of the absorber to be high, it may be made easy to express changes in pressure within the pressure tube when the absorber presses the pressure tube. Therefore, in the eleventh aspect as well, the pressure sensitivity of the portions, which are disposed adjacent to the supporting members, at the pressure tube may be made to be high.

A vehicle bumper structure that is equipped with a pedestrian collision detection sensor according to a twelfth aspect is configured such that, in the eleventh aspect, as seen in plan view, border surfaces of the absorber of different hardnesses are disposed further toward a vehicle transverse direction inner side than both vehicle transverse direction ends of the bumper reinforcement, the border surfaces being inclined toward a vehicle transverse direction inner side on progression toward a vehicle longitudinal direction outer side.

In the vehicle bumper structure that is equipped with a pedestrian collision detection sensor according to the twelfth aspect, the pressure tube may be deformed (crushed) effectively by the absorber. Namely, by adjusting the hardness of the portions, which are disposed adjacent to the supporting members, at the absorber (hereinafter called "adjacent portions" for convenience), the adjacent portions of the absorber may be deformed as follows at the time of a collision with a collision body. For example, a structure may be made such that, at the time of a collision with a collision body, the adjacent portions of the absorber are pivoted toward the vehicle longitudinal direction inner side with the vehicle transverse direction both ends of the bumper reinforcement being the centers. Further, in this case, the absorber starts to bendingly deform toward the vehicle longitudinal direction inner side with the border surfaces being the starting points. In the twelfth aspect, because the border surfaces are offset further toward the vehicle transverse direction inner side than the vehicle transverse direction both ends of the bumper reinforcement, the portions, that deform the pressure tube, at the absorber may be made to be large in the length direction of the absorber. Due thereto, the pressure tube may be effectively deformed (crushed) by the absorber.

A vehicle bumper structure that is equipped with a pedestrian collision detection sensor according to a thirteenth aspect is configured such that, in the eleventh aspect, as seen in plan view, border surfaces of the absorber of different hardnesses are disposed so as to overlap both vehicle transverse direction ends of the bumper reinforcement in a vehicle longitudinal direction, the border surfaces being inclined toward a vehicle transverse direction inner side on progression toward a vehicle longitudinal direction outer side.

In the vehicle bumper structure that is equipped with a pedestrian collision detection sensor according to the thirteenth aspect, the portions of high hardness and the portion of low hardness at the absorber are disposed so as to be lined-up in the vehicle longitudinal direction, at positions that are at the vehicle longitudinal direction outer side with respect to the vehicle transverse direction both ends of the bumper reinforcement. Further, in the same way as in the twelfth aspect, by adjusting the hardness of the adjacent portions of the absorber, a structure may be made such that, at the time of a collision with a collision body, the adjacent portions of the absorber are pivoted toward the vehicle longitudinal direction inner side with the vehicle transverse direction both ends of the bumper reinforcement being the centers. At this time, in the thirteenth aspect, load may be applied by the portions of high hardness, which are disposed at the vehicle longitudinal direction outer side with respect to the border surfaces, so as to crush the portion of low hardness that is disposed at the vehicle longitudinal direction inner side with respect to the border surfaces. Due thereto, the portions, that deform the pressure tube, at the absorber, may be made to be large in the length direction of the absorber. Accordingly, the pressure tube may be deformed (crushed) effectively by the absorber.

A vehicle bumper structure that is equipped with a pedestrian collision detection sensor according to a fourteenth aspect is configured such that, in the third aspect, a hardness of at least the absorber side projecting portions is set to be higher than a hardness of other regions of the absorber, and as seen in plan view, border surfaces of the absorber of different hardnesses are disposed so as to overlap the distal ends of the supporting members in the vehicle transverse direction, the border surfaces being inclined toward vehicle transverse direction outer sides on progression toward a vehicle longitudinal direction outer side.

In the vehicle bumper structure that is equipped with a pedestrian collision detection sensor according to the fourteenth aspect, the portions of high hardness and the portion of low hardness at the absorber are disposed so as to be lined-up in the vehicle transverse direction, at positions that are at the vehicle transverse direction outer sides with respect to the distal ends of the supporting members. Further, for example, by adjusting the hardness of the absorber side projecting portions, a structure may be made in which, at the time of a collision with a collision body, the absorber side projecting portions are pivoted toward the vehicle transverse direction inner side with the distal ends of the supporting members being the centers. At this time, at the absorber, load may be applied by the portions of high hardness, which are disposed at the vehicle transverse direction outer sides with respect to the border surfaces, so as to crush the portion of low hardness that is disposed at the vehicle transverse direction inner side with respect to the border surfaces. Due thereto, the portions that deform the pressure tube at the absorber may be made to be large in the length direction of the absorber. Accordingly, the pressure tube may be deformed (crushed) effectively by the absorber.

A vehicle bumper structure that is equipped with a pedestrian collision detection sensor according to a fifteenth aspect is configured such that, in any one aspect of the eleventh aspect through the fourteenth aspect, the absorber is structured from foamed materials having different foam proportions.

In the vehicle bumper structure that is equipped with a pedestrian collision detection sensor according to the fifteenth aspect, portions of different hardnesses at the absorber may be formed easily by using a foamed material having different foam proportions. Further, an absorber that is suited to each of various types of vehicles for example may be manufactured easily by appropriately adjusting the foam proportions at the portions of different hardnesses of the absorber.

Effects of Invention

In accordance with the vehicle bumper structure that is equipped with a pedestrian collision detection sensor according to the first aspect, a collision with a collision body at a corner portion of the vehicle may be detected.

In accordance with the vehicle bumper structure that is equipped with a pedestrian collision detection sensor according to the second aspect, the detection range of the pedestrian collision detection sensor in the vehicle transverse direction may be set to be large.

In accordance with the vehicle bumper structure that is equipped with a pedestrian collision detection sensor according to the third aspect, collisions with automobiles, which mainly tend to collide from a side of the vehicle, may be detected.

In accordance with the vehicle bumper structure that is equipped with a pedestrian collision detection sensor according to the fourth aspect, the detection accuracy of the pedestrian collision detection sensor in the vehicle transverse direction may be made to be uniform.

In accordance with the vehicle bumper structure that is equipped with a pedestrian collision detection sensor according to the fifth aspect, reaction force with respect to the pressure tube may be generated well.

In accordance with the vehicle bumper structure that is equipped with a pedestrian collision detection sensor according to the sixth aspect, the interior of the closed cross-section of the bumper reinforcement is utilized, and the supporting members may be assembled to the bumper reinforcement.

In accordance with the vehicle bumper structure that is equipped with a pedestrian collision detection sensor according to the seventh aspect, the ability to damage the pressure tube may be reduced.

In accordance with the vehicle bumper structure that is equipped with a pedestrian collision detection sensor according to the eighth aspect, a pedestrian who has fallen on the hood of the vehicle may be detected well.

In accordance with the vehicle bumper structure that is equipped with a pedestrian collision detection sensor and relates to the ninth aspect, the reliability of the pressure detectors may be improved.

In accordance with the vehicle bumper structure that is equipped with a pedestrian collision detection sensor according to the tenth aspect, the pressure sensitivity of the portions, that are disposed adjacent to the supporting members, at the pressure tube may be made to be high.

In accordance with the vehicle bumper structure that is equipped with a pedestrian collision detection sensor according to the eleventh aspect, the pressure sensitivity of the portions, which are disposed adjacent to the supporting members, at the pressure tube may be made to be high.

In accordance with the vehicle bumper structures that are equipped with a pedestrian collision detection sensor according to the twelfth through fourteenth aspects, the pressure tube may be deformed (crushed) effectively by the absorber.

In accordance with the vehicle bumper structure that is equipped with a pedestrian collision detection sensor according to the fifteenth aspect, portions of different hardnesses at the absorber may be formed easily, and an absorber that is suited to each of various types of vehicles for example may be manufactured easily.

BRIEF DESCRIPTION OF DRAWINGS

FIG. 5 is a perspective view that is seen from an obliquely left and front side of the vehicle, and that shows, in an enlarged manner, a supporting member shown in FIG. 4.

FIG. 6 is a perspective view that is seen from an obliquely right and front side of the vehicle, and that shows a fixed state of a pressure sensor at a vehicle right side that is shown in FIG. 2.

DESCRIPTION OF EMBODIMENTS

Figure 1:
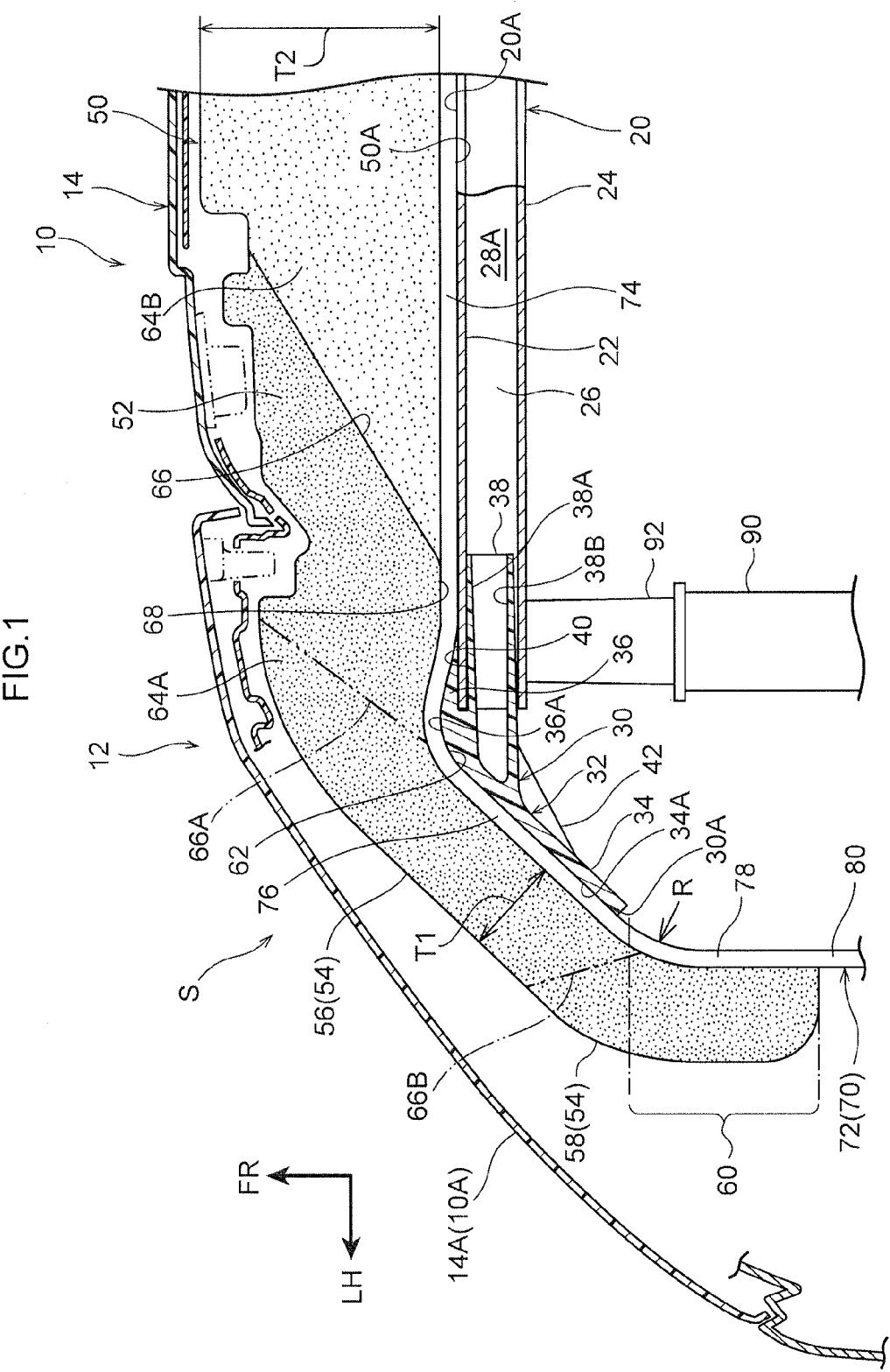
FIG. 1 is a plan sectional view (a cross-sectional view along line 1-1 of FIG. 3) that illustrates a vehicle left side portion of a front bumper to which a vehicle bumper structure that is equipped with a pedestrian collision detection sensor according to a present embodiment is applied.

A front bumper 12, to which is applied a vehicle bumper structure S that is equipped with a pedestrian collision detection sensor 70 according to a present embodiment, is described hereinafter by using the drawings. Note that arrow FR that is shown in the drawings indicates the vehicle front side (the vehicle longitudinal direction outer side), arrow LH indicates the vehicle left side (a vehicle transverse direction one side), and arrow UP indicates the vehicle upper side.

Figure 2:
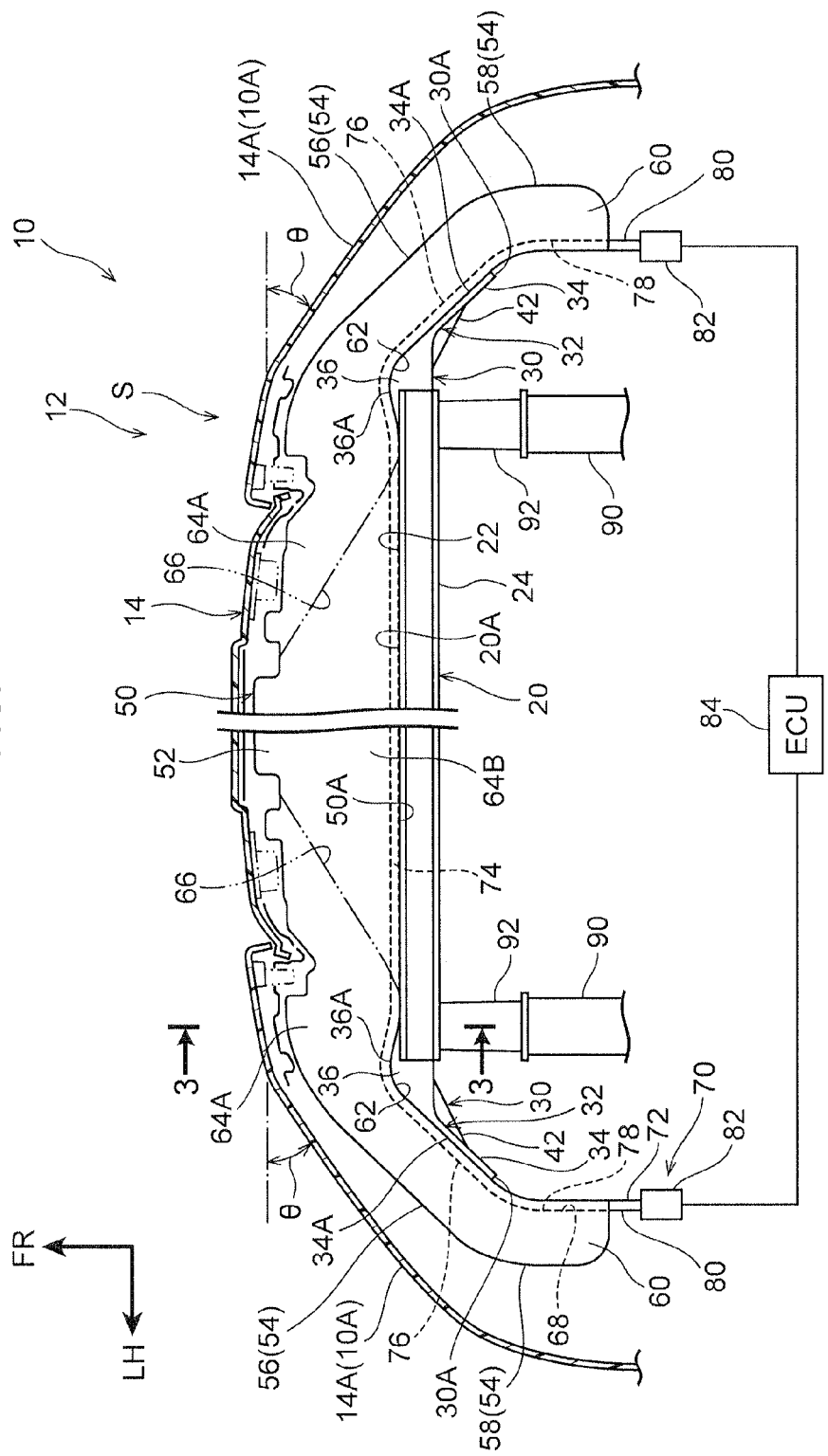
FIG. 2 is a plan view illustrating the entire front bumper shown in FIG. 1.

As shown in FIG. 2, the front bumper 12 is disposed at the front end portion of a vehicle (automobile) 10, and detects (the absence or presence of) a collision of a collision body with the vehicle 10. This front bumper 12 includes a bumper cover 14 that structures the front end of the vehicle 10, and a bumper reinforcement 20 (hereinafter called "bumper RF 20") that forms a bumper frame member. Further, the front bumper 12 includes a pair of left and right supporting members 30 that are disposed at the vehicle transverse direction both sides of the bumper RF 20, and an absorber 50 that is disposed between the bumper cover 14 and the bumper RF 20. Moreover, the front bumper 12 has the pedestrian collision detection sensor 70 for detecting a collision of a collision body with the vehicle 10. The aforementioned respective structures are described hereinafter.

(Bumper Cover 14)

As shown in FIG. 2, the bumper cover 14 is made of resin. Further, the bumper cover 14 extends in the vehicle transverse direction, and is fixedly supported with respect to the vehicle body at unillustrated portions. Moreover, vehicle transverse direction both side portions 14A of the bumper cover 14 are inclined toward the vehicle rear side while heading toward the vehicle transverse direction outer sides as seen in plan view, and structure corner portions 10A of the vehicle 10. Further, at the vehicle 10 of the present embodiment, inclination angle θ, with respect to the vehicle transverse direction, of the vehicle transverse direction both side portions 14A of the bumper cover 14 as seen in plan view are set to be relatively large.

(Bumper RF 20)

As shown in FIG. 2, the bumper RF 20 is formed substantially in the shape of a rectangular pillar that is hollow, and is disposed at the vehicle rear side (i.e., the vehicle longitudinal direction inner side) of the bumper cover 14 with the vehicle transverse direction being the length direction thereof. This bumper RF 20 is structured of a metal material that is an aluminum material or the like, and is manufactured by a method such as extrusion molding or the like. Moreover, the positions of the vehicle transverse direction both ends of the bumper RF 20 in the vehicle transverse direction substantially coincide with the positions of the distal ends of the vehicle transverse direction both side portions 14A of the bumper cover 14. Namely, the bumper RF 20 is not disposed at the vehicle rear side with respect to the vehicle transverse direction both side portions 14A of the bumper cover 14 (the corner portions 10A of the vehicle 10).

Figure 3:
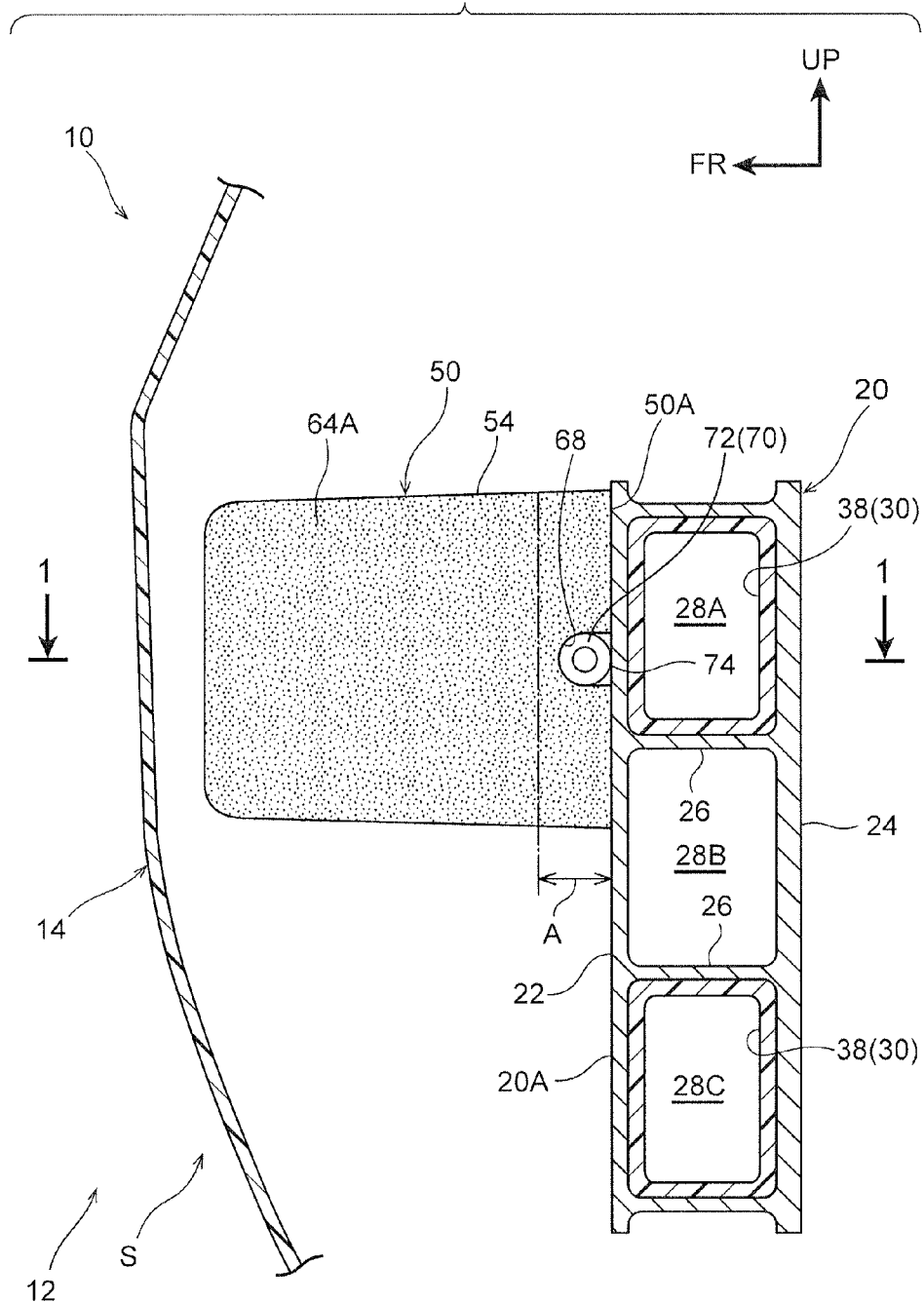
FIG. 3 is a side sectional view (an enlarged cross-sectional view along line 3-3 of FIG. 2) in which the front bumper shown in FIG. 2 is seen from a vehicle left side.

As shown in FIG. 3, reinforcing ribs 26 that are plate-shaped are provided at the interior of the bumper RF 20, and the reinforcing ribs 26 are disposed with the vehicle vertical direction being the plate thickness directions thereof, and connect a front wall 22 and a rear wall 24 of the bumper RF 20. Further, the cross-sectional structure of the bumper RF 20 is made such that plural (three in the present embodiment) substantially rectangular closed cross-sections are lined-up in the vehicle vertical direction. Namely, in the present embodiment, the pair of reinforcing ribs 26 are disposed so as to be lined-up in the vehicle vertical direction at the interior of the bumper RF 20. The closed cross-section that is disposed at the upper portion of the bumper RF 20 is an upper side closed cross-section 28A, and the closed cross-section that is disposed at the vertical direction intermediate portion of the bumper RF 20 is an intermediate closed cross-section 28B, and the closed cross-section that is disposed at the lower portion of the bumper RF 20 is a lower side closed cross-section 28C.

As shown in FIG. 1 and FIG. 2, a pair of left and right front side members 90 that structure frame members at the vehicle body side extend in the vehicle longitudinal direction at the vehicle rear side of the bumper RF 20. Further, the vehicle transverse direction both end portions of the bumper RF 20 are connected to the front ends of the front side members 90 via crash boxes 92. Moreover, in the state in which the bumper RF 20 is connected to the front side members 90, the vehicle transverse direction both ends of the bumper RF 20 project-out slightly toward the vehicle transverse direction outer sides with respect to the crash boxes 92 and the front side members 90.

(Supporting Members 30)

As shown in FIG. 2, the supporting members 30 are made of resin. Further, the supporting members 30 are provided at the vehicle transverse direction both end portions of the bumper RF 20 respectively, and project-out toward the vehicle transverse direction outer sides from the vehicle transverse direction both end portions of the bumper RF 20. Namely, the supporting members 30 are respectively disposed at the vehicle rear side with respect to the vehicle transverse direction both side portions 14A of the bumper cover 14 (the corner portions 10A of the vehicle 10). Further, because the pair of supporting members 30 are structured symmetrical to the left and the right, in the following description, the supporting member 30 that is disposed at the vehicle left side is described, and description of the supporting member 30 that is disposed at the vehicle right side is omitted.

Figure 4:
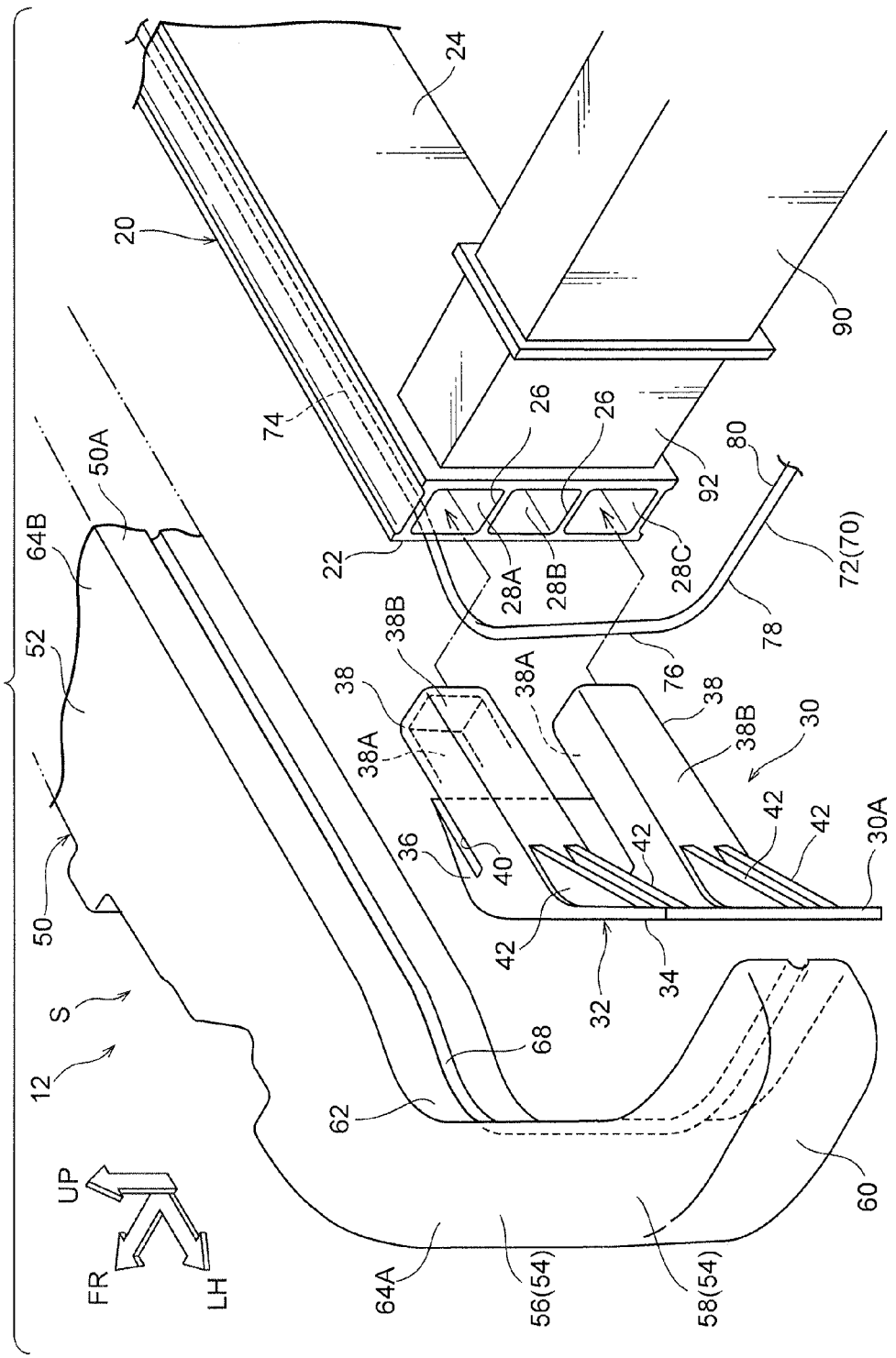
FIG. 4 is an exploded perspective view illustrating a state in which the vehicle left side portion of the front bumper shown in FIG. 1 is disassembled, seen from an obliquely left and rear side of the vehicle.

As shown in FIG. 1, FIG. 4 and FIG. 5, the supporting member 30 includes a main body portion 32, a pair of upper and lower fit-together tube portions 38 (elements that can be interpreted as "fit-together portions" in a broad sense), and plural (at four places in the present embodiment) reinforcing ribs 42 that serve as "ribs". The main body portion 32 is formed in the shape of a substantially V-shaped plate that opens toward the vehicle rear side and the vehicle transverse direction inner side as seen in plan view. Concretely, the main body portion 32 includes an inclined wall 34 that is inclined toward the vehicle rear side while heading toward the vehicle transverse direction outer side as seen in plan view, and a front wall 36 that extends toward the vehicle transverse direction inner side from the front end of the inclined wall 34.

Further, the vehicle transverse direction inner side portions of the front walls 36 of the main body portions 32 are disposed so as to cover the vehicle transverse direction both end portions of the bumper RF 20 from the vehicle front side, and face a front surface 20A of the bumper RF 20 (see FIG. 1). Further, the front surface of the front wall 36 is configured as a curved surface 36A, and the curved surface 36A is curved (bulges-out) in a substantial circular-arc shape that is convex toward the vehicle front side as seen in plan view. The vehicle transverse direction outer side end at the curved surface 36A is connected smoothly to an inclined surface 34A that structures the front surface of the inclined wall 34. On the other hand, the vehicle transverse direction inner side end portion at the curved surface 36A is formed so as to contact the front surface of the bumper RF 20 as seen in plan view. Namely, the plate thickness of the front wall 36 is set to be thinner toward the vehicle transverse direction inner side, and the curved surface 36A is formed such that a step does not arise at the seam portion between the vehicle transverse direction inner side end at the curved surface 36A and the front surface 20A of the bumper RF 20. Due thereto, a continuous surface is formed by the front surface 20A of the bumper RF 20, the curved surface 36A of the supporting member 30, and the inclined surface 34A of the supporting member 30 (see FIG. 1).

The fit-together tube portions 38 are formed in the shapes of substantially rectangular tubes whose axial directions are the vehicle transverse direction, and project-out from the front portion of the inclined wall 34 toward the vehicle transverse direction inner side. Further, the pair of fit-together tube portions 38 are disposed so as to be lined-up in the vehicle vertical direction with a predetermined interval therebetween, and the distal end portions (the vehicle transverse direction inner side portions) at the fit-together tube portions 38 are respectively fit into the upper side closed cross-section 28A and the lower side closed cross-section 28C of the bumper RF 20 (see FIG. 1 and FIG. 4). Due thereto, the supporting members 30 are assembled to the vehicle transverse direction both end portions of the bumper RF 20, and extend toward the vehicle transverse direction outer sides and the vehicle rear side from the vehicle transverse direction both end portions of the bumper RF 20.

Further, a slit 40, which opens toward the vehicle transverse direction inner side as seen in plan view, is formed in the supporting member 30 between front walls 38A of the fit-together tube portions 38 and the front wall 36 of the main body portion 32. Further, the front wall 22 of the bumper RF 20 is fit into the slit 40, in the state in which the supporting member 30 is assembled to the bumper RF 20.

The reinforcing ribs 42 are formed as pairs in the vehicle vertical direction, and one pair of the reinforcing ribs 42 is provided for each of the fit-together tube portions 38. The reinforcing ribs 42 are formed in substantially triangular plate shapes, and are disposed such that the vehicle vertical direction is the plate thickness direction thereof. Further, the reinforcing ribs 42 project-out toward the vehicle rear side from the vehicle transverse direction outer side portion at rear walls 38B of the fit-together tube portions 38, and are joined to the rear surface of the inclined wall 34. Due thereto, the fit-together tube portions 38 and the inclined wall 34 are connected by the reinforcing ribs 42, and a structure is made such that the bending rigidity toward the vehicle rear side at the main body portion 32 of the supporting member 30 is made to be high.

(Absorber 50)

As shown in FIG. 2, the absorber 50 is structured by a foamed resin material, i.e., a urethane foam or the like. This absorber 50 is provided between the bumper cover 14 and the bumper RF 20, and is formed in an elongated shape whose length direction is the vehicle transverse direction, and is bent toward the vehicle rear side at the vehicle transverse direction both side portions thereof. Concretely, the absorber 50 includes an absorber main portion 52 that structures the vehicle transverse direction intermediate portion of the absorber 50, and absorber side portions 54 that structure the vehicle transverse direction both side portions of the absorber 50. Further, as shown in FIG. 3, the absorber 50 is formed in a substantially rectangular shape as seen in a cross-section viewed from the length direction.

The absorber main portion 52 is disposed adjacent to the vehicle front side of the upper portion of the bumper RF 20 (in detail, the portion that structures the upper side closed cross-section 28A), and is fixed to the front surface 20A of the bumper RF 20. Further, as shown in FIG. 2, the length in the length direction of the absorber main portion 52 is set so as to be substantially the same length as the length in the length direction of the bumper RF 20, and, in the vehicle transverse direction, the positions of the vehicle transverse direction both ends of the absorber main portion 52 substantially coincide with the positions of the vehicle transverse direction both ends of the bumper RF 20.

As shown in FIG. 1 as well, the absorber side portions 54 project-out further toward the vehicle transverse direction outer sides than the bumper RF 20, and are formed so as to cover the upper portions of the supporting members 30 from the vehicle front side. Concretely, inclined portions 56, which structure the portions at the proximal end sides of the absorber side portions 54, extend from the vehicle transverse direction both ends of the absorber main portion 52 toward the vehicle rear side while heading toward the vehicle transverse direction outer sides along the main body portions 32 of the supporting members 30. Further, the inclined portions 56 are disposed adjacent to the vehicle front sides of the curved surfaces 36A and the inclined surfaces 34A of the main body portions 32. Distal end portions 58 (corresponding to the "vehicle transverse direction both end portions of the absorber" in the present invention), which structure the portions at the distal end sides of the absorber side portions 54, are disposed further toward the vehicle transverse direction outer sides than distal ends 30A of the supporting members 30 (in detail, the rear ends of the main body portions 32). These distal end portions 58 are bent toward the vehicle rear side at positions that are at the substantially vehicle transverse direction outer sides of the distal ends 30A of the supporting members 30, and project-out further toward the vehicle rear side than (overhang) the distal ends 30A of the supporting members 30. Further, these projecting (overhanging) portions are made to be absorber side projecting portions 60, and the absorber side projecting portions 60 extend in the vehicle longitudinal direction. Further, angles R (see FIG. 1) are formed at the bent portions at the distal end portions 58, and the distal end portions 58 are structured so as to bend smoothly.

Moreover, curved concave portions 62 are formed at a rear surface 50A of the absorber 50 at the portions that face the curved surfaces 36A of the supporting members 30. The curved concave portions 62 are formed in substantially circular-arc shapes so as to run along the curved surfaces 36A as seen in plan view.

Further, at the absorber 50, the hardness of the absorber side portions 54, and the portions adjacent to the absorber side portions 54 at the absorber main portion 52, are configured to be high as compared with the hardness of the other portion (in FIG. 1, the portion that is configured to have high hardness is illustrated with a higher density of dots). The portions of high hardness at the absorber 50 are made to be hard portions 64A, and the portion whose hardness is lower than that of the hard portions 64A is made to be soft portion 64B, and the foam proportion at the hard portions 64A is set to be low as compared with the foam proportion at the soft portion 64B. Further, border surfaces 66 between the hard portions 64A and the soft portion 64B at the absorber 50 are set at the vehicle transverse direction inner sides with respect to the vehicle transverse direction both ends of the bumper RF 20, and are inclined toward the vehicle inner side while heading toward the vehicle front side as seen in plan view.

Moreover, as shown in FIG. 1, thickness dimension T1 at the absorber side portion 54 (the dimension in the direction orthogonal to the direction in which the absorber side portion 54 extends as seen in plan view) is set to be small as compared with thickness dimension T2 of the absorber main portion 52 (the dimension in the direction (i.e., the vehicle longitudinal direction) that is orthogonal to the direction in which the absorber main portion 52 extends as seen in plan view). Namely, the thickness of the portions, which are disposed adjacent to the supporting members 30, at the absorber 50 is set to be thin as compared with the thickness of the portion, which is disposed adjacent to the bumper RF 20, at the absorber 50.

Further, as shown in FIG. 3 and FIG. 4, a holding groove portion 68, which serves as a "holding portion" that holds a pressure tube 72 described later, is formed in the rear surface 50A of the absorber 50. This holding groove portion 68 is formed in a substantial C-shape that opens toward the vehicle rear side as seen in a side sectional view (in detail, in a circular shape that is partially open toward the vehicle rear side), and passes-through in the length direction of the absorber 50.

(Pedestrian Collision Detection Sensor 70)

As shown in FIG. 2, the pedestrian collision detection sensor 70 includes the pressure tube 72 that is formed in an elongated shape, and pressure sensors 82 that serve as "pressure detectors" that output signals corresponding to changes in pressure of the pressure tube 72.

The pressure tube 72 is structured as a hollow structure of a substantially annular cross-section. The outer diameter dimension of this pressure tube 72 is set to be slightly small as compared with the inner diameter dimension of the holding groove portion 68 of the absorber 50, and the length of the pressure tube 72 in the length direction is set to be long as compared with the length of the absorber 50 in the length direction. The pressure tube 72 is assembled into (fit into) the holding groove portion 68 (see FIG. 3).

Due thereto, the pressure tube 72 is disposed along the length direction of the absorber 50. Further, the portion, which is disposed along the absorber main portion 52, at the pressure tube 72 is made to be a pressure tube main portion 74, and the portions, which are disposed along the absorber side portions 54, at the pressure tube 72 are made to be pressure tube side portions 76 (vehicle transverse direction both side portions of the pressure tube 72). Further, the portions, which are disposed further toward the vehicle transverse direction outer sides than the distal ends 30A of the supporting members 30, at the pressure tube side portions 76 are made to be distal end portions 78 (corresponding to the "vehicle transverse direction both end portions of the pressure tube" of the present invention) of the pressure tube side portions 76.

Moreover, the distal end portions 78 of the pressure tube side portions 76 are bent smoothly toward the vehicle rear side along the absorber side portions 54, and project-out further toward the vehicle rear side than (overhang) the distal ends 30A of the supporting members 30. Further, these projecting (overhanging) portions are made to be pressure tube side projecting portions 80, and the pressure tube side projecting portions 80 extend along the vehicle longitudinal direction. Note that the length of the pressure tube 72 in the length direction is set to be long as compared with the length of the absorber 50 in the length direction, and therefore, the pressure tube side projecting portions 80 extend further toward the vehicle rear side than the absorber side projecting portions 60 of the absorber 50.

Further, in the state in which the pressure tube 72 is assembled in the holding groove portion 68 of the absorber 50, as seen in a cross-section that is viewed from the length direction of the absorber 50, the outer peripheral surface of the pressure tube 72 contacts the rear surface 50A of the absorber 50, or is disposed with a slight gap therebetween (see FIG. 3). Due thereto, the pressure tube 72 is disposed adjacent to the front surface 20A of the bumper RF 20, the curved surfaces 36A of the supporting members 30, and the vehicle front sides of the inclined surfaces 34A of the supporting members 30. A configuration is made in which, when load toward the vehicle rear side is applied to the absorber 50 and the absorber 50 presses the pressure tube 72, reaction force with respect to the pressure tube 72 is generated by the bumper RF 20 and the supporting members 30.

The pressure sensors 82 are provided at the vehicle transverse direction both ends of the pressure tube 72. As shown in FIG. 6, the pressure sensor 82 is fastened and fixed, by an unillustrated fastening member such as a bolt or the like, to a fender bracket 86 that serves as a "vehicle side member" that is disposed at the vehicle rear side of the bumper cover 14 (not shown in FIG. 6). This fender bracket 86 is structured of metal, and is fixed to a fender inner 96 that covers a front wheel 94 of the vehicle 10 from the vehicle upper side.

Further, as shown in FIG. 2, the pressure sensors 82 are electrically connected to an ECU 84 (an element that can be interpreted as a "collision judging section" in the broad sense). Due to the pressure tube 72 deforming, a signal corresponding to the change in pressure within the pressure tube 72 is outputted from the pressure sensor 82 to the ECU 84.

Further, a collision speed sensor (not shown) is electrically connected to the aforementioned ECU 84, and the collision speed sensor outputs a signal, which corresponds to the speed of a collision with a collision body, to the ECU 84. The ECU 84 computes the collision load on the basis of the aforementioned output signal of the pressure sensor 82, and computes the collision speed on the basis of the output signal of the collision speed sensor. Moreover, the ECU 84 determines the effective mass of the collision body from the computed collision load and collision speed, and judges whether or not the effective mass exceeds a threshold value, and judges whether the collision body that collides with the front bumper 12 is a pedestrian or is other than a pedestrian (e.g., is an obstacle on the road such as a road sign or a bollard or the like).

Operation and effects of the present embodiment are described next.

In the vehicle 10 that is equipped with the front bumper 12 structured as described above, at the time of a collision of the vehicle 10 and a collision body, the bumper cover 14 deforms toward the vehicle rear side and presses the absorber 50. Therefore, the absorber 50 is crushed (compressively deforms) in the vehicle longitudinal direction, and the pressure tube 72 deforms (is crushed). Due thereto, the pressure within the pressure tube 72 changes.

The pressure sensor 82 outputs to the ECU 84 a signal that corresponds to the change in pressure of the pressure tube 72, and the ECU 84 computes the collision load on the basis of the output signal of the pressure sensor 82. On the other hand, the ECU 84 computes the collision speed on the basis of the output signal of the collision speed sensor. Further, the ECU 84 determines the effective mass of the collision body from the computed collision load and collision speed, and judges whether or not the effective mass exceeds a threshold value, and judges whether or not the collision body that has collided with the front bumper 12 is a pedestrian.

Here, the supporting members 30 that are structured as bodies separate from the bumper RF 20 are assembled to the vehicle transverse direction both end portions of the bumper RF 20, respectively. The supporting members 30 extend from the vehicle transverse direction both end portions of the bumper RF 20 toward the vehicle transverse direction outer sides and the vehicle rear side, respectively, as seen in plan view. Further, the supporting members 30 are disposed adjacent to the vehicle rear sides of the absorber side portions 54 of the absorber 50 and the pressure tube side portions 76 of the pressure tube 72.

Therefore, even in a case in which the bumper RF 20 cannot be disposed at the vehicle rear side with respect to the corner portions 10A of the vehicle 10 due to limitations in processing at the bumper RF 20 or the like, the absorber side portions 54 and the pressure tube side portions 76 may be supported from the vehicle rear side by the supporting members 30.

This point is described in detail hereinafter. In a case in which the bumper RF 20 is disposed at the vehicle rear side with respect to the corner portions 10A of the vehicle 10, the bumper RF 20 must be extended further toward the vehicle transverse direction outer sides than the front side members 90. Further, in order to ensure the distance between the bumper cover 14 and the bumper RF 20, and the like, the portions that are extended toward the vehicle transverse direction outer sides at the bumper RF 20 must be bent toward the vehicle rear side so as to correspond to the inclination angle θ of the vehicle transverse direction both side portions 14A at the bumper cover 14.

In this regard, as described above, the bumper RF 20 is formed by extrusion molding or the like. Therefore, in a case in which the portions that are extended toward the vehicle transverse direction outer sides at the bumper RF 20 are bent toward the vehicle rear side, the bumper RF 20 is subjected to bending processing after the bumper RF 20 is extrusion-molded. Further, in the bending processing of the bumper RF 20, there is the limitation in terms of the processing that bending processing of greater than or equal to a predetermined angle cannot be carried out. Therefore, at the vehicle 10 at which the inclination angle θ of the vehicle transverse direction both side portions 14A at the bumper cover 14 is relatively large such as that of the present embodiment, the bumper RF 20 cannot be bent due to the aforementioned limitation in processing. Due thereto, there is a structure in which the bumper RF 20 cannot be disposed at the vehicle rear side with respect to the corner portions 10A of the vehicle 10.

Accordingly, in the vehicle 10 that has such a structure, if the supporting members 30 were to be omitted, the absorber side portions 54 and the pressure tube side portions 76 may not be supported from the vehicle rear side. In other words, at the time of a collision of the corner portion 10A of the vehicle 10 and a collision body, reaction force with respect to the pressure tube 72 may not be generated. Therefore, a collision with a collision body may not be detected at the corner portions 10A of the vehicle 10.

In contrast, in the present embodiment, as described above, the supporting members 30 are provided at the vehicle transverse direction both sides of the bumper RF 20. Therefore, at the vehicle rear sides of the corner portions 10A of the vehicle 10, the absorber side portions 54 and the pressure tube side portions 76 may be supported from the vehicle rear side by the supporting members 30. Due thereto, at the time of a collision of the corner portion 10A of the vehicle 10 and a collision body, reaction force with respect to the pressure tube 72 may be generated by the supporting member 30. As a result, collisions with collision bodies may be detected at the corner portions 10A of the vehicle 10.

Further, the distal end portions 58 of the absorber 50 and the distal end portions 78 of the pressure tube 72 are disposed further toward the vehicle transverse direction outer sides than the distal ends 30A of the supporting members 30. Therefore, the detection range of the pedestrian collision detection sensor 70 in the vehicle transverse direction may be set to be large.

Moreover, the absorber side projecting portions 60 and the pressure tube side projecting portions 80 project-out toward the vehicle rear side with respect to the distal ends 30A of the supporting members 30, and extend in the vehicle longitudinal direction. Therefore, when a collision body collides from the side (a vehicle transverse direction outer side) of the vehicle 10, load toward the vehicle transverse direction inner side is inputted to the absorber side projecting portion 60 and the pressure tube side projecting portion 80, and the absorber side projecting portion 60 and the pressure tube side projecting portion 80 deform toward the vehicle transverse direction inner side. Due thereto, a collision body that collides from the side of the vehicle 10 also may be detected. Accordingly, collisions with automobiles that tend to collide mainly from a side of the vehicle 10 may be detected.

Further, the curved surfaces 36A of the supporting members 30 are curved in substantial circular-arc shapes that are convex toward the vehicle front side as seen in plan view, and form a continuous surface with the front surface 20A of the bumper RF 20. Therefore, the pressure tube 72 may be bent toward the vehicle transverse direction outer sides and the vehicle rear side while being curved along the curved surfaces 36A. Namely, the pressure tube 72 is bent smoothly at the vehicle transverse direction both ends of the bumper RF 20, and may be disposed along the main body portions 32 of the supporting members 30. Due thereto, changes in pressure at the border portions between the pressure tube main portion 74 and the pressure tube side portions 76 of the pressure tube 72 becoming large may be suppressed. As a result, dispersion in changes in pressure of the pressure tube 72 in the vehicle transverse direction are suppressed, and the detection accuracy of the pedestrian collision detection sensor 70 in the vehicle transverse direction may be made to be uniform.

Moreover, the curved surfaces 36A of the supporting members 30 are disposed at the vehicle front sides of the vehicle transverse direction both end portions of the bumper RF 20. Therefore, the vehicle transverse direction both ends of the bumper RF 20 may be covered from the vehicle front side by the curved surfaces 36A (the supporting members 30). Due thereto, the pressure tube 72 may be protected by the supporting members 30 from, for example, burrs or the like that arise at the vehicle transverse direction both ends of the bumper RF 20. Due thereto, the ability to damage the pressure tube 72 may be reduced.

Further, the reinforcing ribs 42 are formed integrally with the supporting members 30, and the reinforcing ribs 42 connect the fit-together tube portions 38 and the inclined walls 34, with the vehicle vertical direction being the plate thickness direction of the reinforcing ribs 42. Therefore, the bending rigidity of the supporting members 30 toward the vehicle rear side may be made to be high by the reinforcing ribs 42. Due thereto, at the time of a collision of the vehicle 10 and a collision body, the reaction force with respect to the pressure tube 72 may be generated well.

Further, the absorber 50 and the pressure tube 72 are disposed adjacent to the vehicle front side of the upper portion of the bumper RF 20 (in detail, the portion that structures the upper side closed cross-section 28A). Due thereto, a pedestrian who falls onto the hood of the vehicle 10 may be detected well. Namely, at the time of a collision of the vehicle 10 and a pedestrian, because the leg portions of the pedestrian hit the bumper cover 14, the pedestrian tends to fall onto the hood of the vehicle 10. At this time, the bumper cover 14 deforms so as to collapse-in toward the obliquely vehicle rear and lower side, and mainly the upper portion of the absorber 50 is pressed by the bumper cover 14. Due thereto, by placing the absorber 50 and the pressure tube 72 adjacent to the vehicle front side of the upper portion of the bumper RF 20, a pedestrian who has fallen onto the hood of the vehicle 10 may be detected well.

Moreover, the pressure sensors 82 are fastened and fixed to the fender brackets 86 that are made of metal. Therefore, the reliability of the pressure sensors 82 may be improved as compared with a case in which the pressure sensors 82 were to be fixed to the bumper cover 14.

Namely, because the pressure sensors 82 are fixed to the fender brackets 86 that are made of metal, as compared with a case in which the pressure sensors 82 were to be fixed to the bumper cover 14 that is made of resin, for example, the mounting strength of the pressure sensors 82 may be made to be high, and vibrations and the like that are inputted to the pressure sensors 82 may be reduced. Further, for example, also when a minor impact is applied to the bumper cover 14 at a time other than when the vehicle 10 is traveling, that impact being directly inputted to the pressure sensors 82 may be suppressed. Moreover, because the fender brackets 86 are disposed at the vehicle rear side of the bumper cover 14, the pressure sensors 82 being covered with water by rain water or snow or the like may be suppressed. Due to the above, the reliability of the pressure sensors 82 may be improved as compared with a case in which the pressure sensors 82 were to be fixed to the bumper cover 14.

Moreover, at the absorber 50, the thickness dimension T1 of the absorber side portions 54 is set to be small as compared with the thickness dimension T2 of the absorber main portion 52. Therefore, it may be made easy to express the change in pressure within the pressure tube 72 when the absorber side portion 54 presses the pressure tube side portion 76. Due thereto, the pressure sensitivity of the pressure tube side portions 76 at the pressure tube 72 may be made high. Accordingly, the pressure sensitivity of the pedestrian collision detection sensor 70 at the corner portions 10A of the vehicle 10 may be made high.

Moreover, the absorber 50 is structured by the hard portions 64A and the soft portion 64B that have different hardnesses, and the absorber side portions 54 are structured by the hard portions 64A. Therefore, the pressure tube 72 may be pressed well toward the supporting member 30 side by the absorber side portion 54 whose hardness is set to be high. Further, in this case as well, it may be made easy to express the change in pressure within the pressure tube 72, and therefore, the pressure sensitivity of the pressure tube side portions 76 at the pressure tube 72 may be made high.

Further, at the absorber 50, the foam proportion of the hard portions 64A is set to be small as compared with the foam proportion of the soft portion 64B. Due thereto, at the absorber 50, it may be easily made to form the hard portions 64A and the soft portion 64B that have different hardnesses. Further, the absorber 50 that is suited to each of various types of vehicles for example may be manufactured easily by appropriately adjusting the foam proportions of the hard portions 64A and the soft portion 64B.

Modified Example 1 of Present Embodiment

In modified example 1, as compared with the present embodiment, the hardness of the absorber side portions 54 (the hard portions 64A) of the absorber 50 is set to be even higher. For example, the foam proportion of the hard portions 64A is set to be five times. Due thereto, at the time of a collision of the vehicle 10 with a collision body, the pressure tube 72 may be effectively deformed (crushed) by the absorber 50.

Figure 8A:
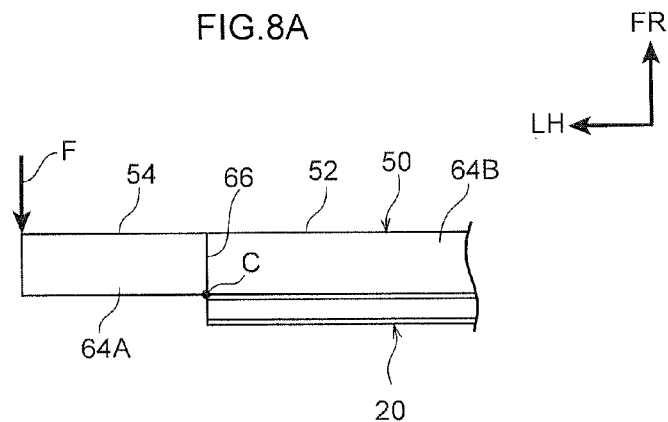
FIG. 8A is a plan view schematically showing an absorber of a comparative example.
Figure 8B:
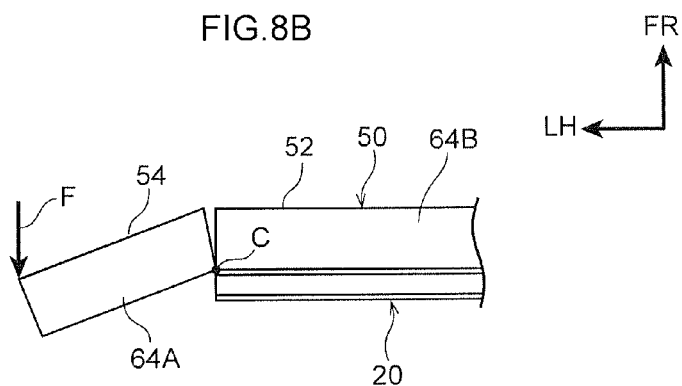
FIG. 8B is an explanatory drawing for explaining deformation of the absorber when load toward the vehicle rear side is inputted from the state of FIG. 8A.

This point is described hereinafter in comparison with a comparative example. In the comparative example, the border surfaces 66 of the absorber 50 are set at different positions as compared with modified example 1. Concretely, as shown in FIG. 8A, the border surfaces 66 of the comparative example extend in the vehicle longitudinal direction, and the positions in the vehicle transverse direction of the border surfaces 66 substantially coincide with the positions of the vehicle transverse direction both ends of the bumper RF 20. Further, by setting the hardness of the absorber side portions 54 as described above, there can be a structure in which, when load F toward the vehicle rear side is inputted to the absorber side portions 54, the absorber side portions 54 and the supporting members 30 (not illustrated in FIG. 8A and FIG. 8B) pivot toward the vehicle rear side with the vehicle transverse direction both ends of the bumper RF 20 being centers C (see FIG. 8B). At this time, the absorber side portions 54 start to bend with the rear ends of the border surfaces 66 being the bending points.

Figure 7A:
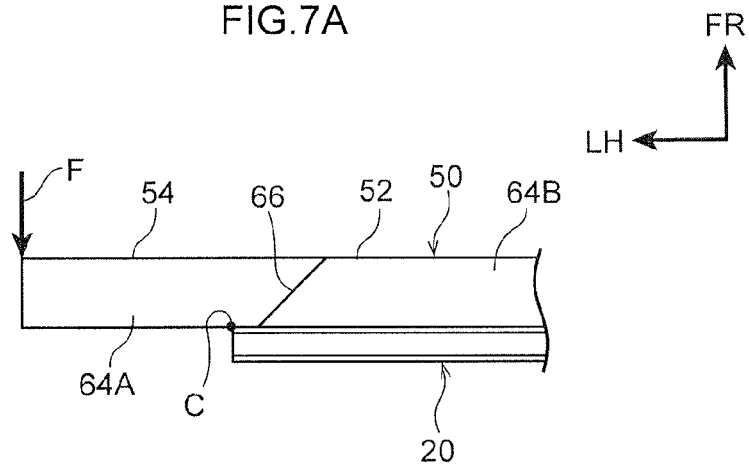
FIG. 7A is a plan view schematically showing an absorber in modified example 1 of the present embodiment.
Figure 7B:
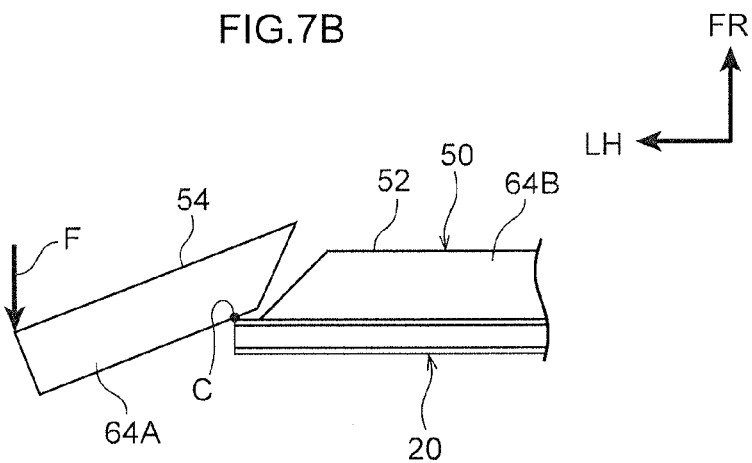
FIG. 7B is an explanatory drawing for explaining deformation of the absorber at a time when load toward a vehicle rear side is inputted from the state of FIG. 7A.
Figure 7C:
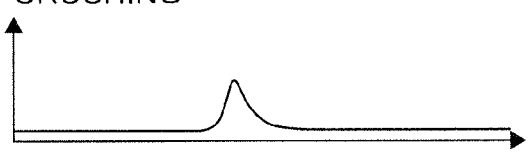
FIG. 7C is a graph showing an amount of crushing of the pressure tube in the state of FIG. 7B.
Figure 8C:
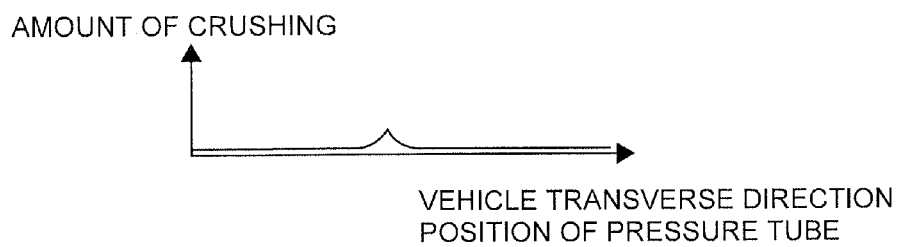
FIG. 8C is a graph showing an amount of crushing of the pressure tube in the state of FIG. 8B.

In contrast, in modified example 1, as shown in FIG. 7A and FIG. 7B, when the load F toward the vehicle rear side is inputted to the absorber side portions 54, in the same way as described above, the absorber side portions 54 and the supporting members 30 (not illustrated in FIG. 7A and FIG. 7B) start to pivot toward the vehicle rear side with the vehicle transverse direction both ends of the bumper RF 20 being the centers C. Here, the border surfaces 66 of the hard portions 64A and the soft portion 64B at the absorber 50 are inclined toward the vehicle front side while heading toward the vehicle transverse direction inner side as seen in plan view, and are disposed further toward the vehicle transverse direction inner side than the vehicle transverse direction both ends of the bumper RF 20. Namely, the border surfaces 66 are offset toward the vehicle transverse direction inner side with respect to the centers C that are the centers of pivoting of the absorber side portions 54. Therefore, when the absorber side portions 54 start to pivot toward the vehicle rear side, the absorber 50 starts to bend with the border surfaces 66, which are offset toward the vehicle transverse direction inner side from the centers C, being the bending points. Due thereto, as compared with the above-described comparative example, the portions that deform the pressure tube 72 at the absorber 50 may be enlarged in the length direction of the absorber 50. As a result, as can be understood by comparing FIG. 7C and FIG. 8C, the amount of crushing of the pressure tube 72 is large as compared with the above-described comparative example. Due to the above, the pressure tube 72 may be effectively deformed (crushed) by the absorber 50. Note that FIG. 7C and FIG. 8C illustrate the amount of crushing of the pressure tube 72 with respect to the vehicle transverse direction position of the pressure tube 72 when the pressure tube 72 deforms.

Modified Example 2 of Present Embodiment

Figure 9A:
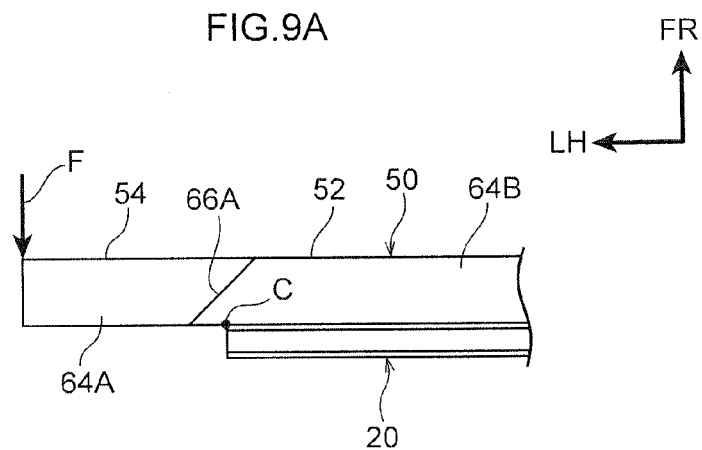
FIG. 9A is a plan view schematically showing an absorber of modified example 2 of the present embodiment.

In modified example 2, the positions of the border surfaces of the absorber 50 are changed with respect to above-described modified example 1. Namely, as shown in FIG. 1 and FIG. 9A, as seen in plan view, border surfaces 66A of modified example 2 are inclined toward the vehicle transverse direction inner side while heading toward the vehicle front side, and are disposed so as to overlap the vehicle transverse direction both ends of the bumper RF 20 in the vehicle longitudinal direction. In detail, the positions of the rear ends of the border surfaces 66A are disposed at the vehicle transverse direction outer sides with respect to the vehicle transverse direction both ends of the bumper RF 20, and the positions of the front ends of the border surfaces 66A are disposed at the vehicle transverse direction inner side with respect to the vehicle transverse direction both ends of the bumper RF 20. Therefore, the hard portions 64A and the soft portion 64B are disposed so as to be lined-up in the vehicle longitudinal direction, at positions at the vehicle front sides with respect to the vehicle transverse direction both ends of the bumper RF 20. Due thereto, in modified example 2 as well, the pressure tube 72 may be effectively deformed (crushed) by the absorber 50 at the time of a collision of the vehicle 10 with a collision body.

Figure 9B:
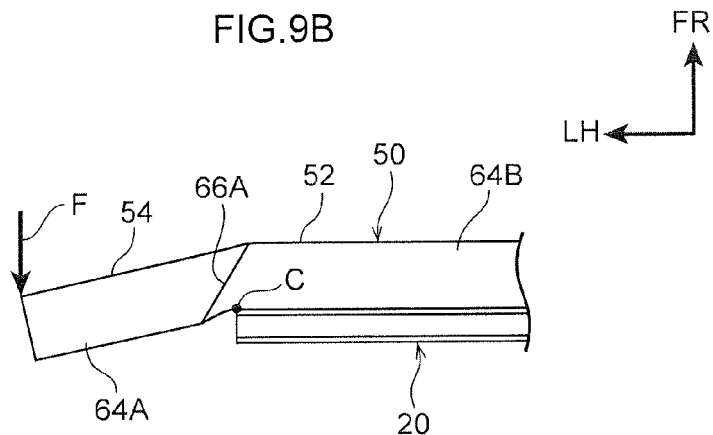
FIG. 9B is an explanatory drawing for explaining deformation of the absorber when load toward the vehicle rear side is inputted from the state of FIG. 9A.
Figure 9C:
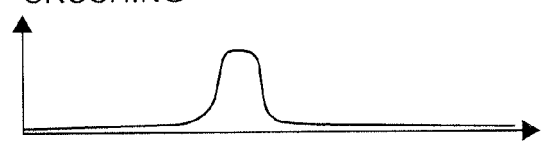
FIG. 9C is a graph showing an amount of crushing of the pressure tube in the state of FIG. 9B.

Namely, as shown in FIG. 9B, when the load F toward the vehicle rear side is inputted to the absorber side portions 54, in the same way as in above-described modified example 1, the absorber 50, together with the supporting members 30 (not illustrated in FIG. 9A and FIG. 9B), start to pivot toward the vehicle rear side with the vehicle transverse direction both ends of the bumper RF 20 being the centers C. At this time, in modified example 2, load may be applied by the hard portions 64A, which are disposed at the vehicle front sides with respect to the border surfaces 66A, such that the soft portion 64B, which is disposed at the vehicle rear side with respect to the border surfaces 66A, is crushed. Due thereto, the portions that deform the pressure tube 72 at the absorber 50 may be enlarged in the length direction of the absorber 50. As a result, as shown in FIG. 9C, the amount of crushing of the pressure tube 72 is large. Accordingly, the pressure tube 72 may be effectively deformed (crushed) by the absorber 50. Note that FIG. 9C illustrates the amount of crushing of the pressure tube 72 with respect to the vehicle transverse direction position of the pressure tube 72 when the pressure tube 72 deforms.

Modified Example 3 of Present Embodiment

In modified example 3, the positions of the border surfaces of the absorber 50 are changed with respect to above-described modified example 1. Namely, as shown in FIG. 1, as seen in plan view, border surfaces 66B of modified example 3 extend toward the vehicle transverse direction outer sides while heading toward the vehicle front side, and are disposed so as to overlap the distal ends 30A of the supporting members 30 in the vehicle transverse direction. That is, in modified example 3, at least the absorber side projecting portions 60 are set as the hard portions 64A, and the other portion is set as the soft portion 64B. Further, the hard portions 64A and the soft portion 64B are disposed so as to be lined-up in the vehicle transverse direction at positions at the vehicle transverse direction outer sides with respect to the distal ends 30A of the supporting members 30. Due thereto, although not illustrated, in a case in which a collision body collides from a side of the vehicle 10, in the same way as in modified example 2, load may be applied such that the soft portion 64B is crushed by the hard portion 64A that is disposed at the vehicle transverse direction outer side with respect to the border surface 66B. Therefore, in the same way as in modified example 2, the portions, that deform the pressure tube 72, of the absorber 50 may be enlarged in the length direction of the absorber 50. Due thereto, the amount of crushing of the pressure tube 72 is large. As a result, the pressure tube 72 may be effectively deformed (crushed) by the absorber 50 when a collision body collides from a side of the vehicle 10.

Note that, in the present embodiment, the distal end portions 58 of the absorber side portions 54 are disposed further toward the vehicle transverse direction outer sides than the distal ends 30A of the supporting members 30, but the distal end portions 58 may be omitted at the absorber side portions 54. Namely, there may be a structure in which the absorber side portions 54 do not project-out further toward the vehicle transverse direction outer sides than the distal ends 30A of the supporting members 30.

Further, in the present embodiment, the absorber side projecting portions 60 of the absorber side portions 54 project-out further toward the vehicle rear side than (overhang) the distal ends 30A of the supporting members 30. However, the absorber side projecting portions 60 may be omitted at the absorber side portions 54. Namely, there may be a structure in which the absorber side portions 54 do not project-out further toward the vehicle rear side than (overhang) the distal ends 30A of the supporting members 30.

Moreover, in the present embodiment, the pressure tube 72 is held at the holding groove portion 68 of the absorber 50, but there may be a structure in which the pressure tube 72 is held by the bumper RF 20 and the supporting members 30. Namely, holding groove portions that hold the pressure tube 72 may be formed in the bumper RF 20 and the supporting members 30.

Further, in the present embodiment, the absorber 50 has the hard portions 64A and the soft portion 64B that have different hardnesses, and the absorber 50 is structured to have two types of hardnesses. However, the types of hardnesses of the absorber 50 may be changed appropriately. For example, there may be a structure in which the hardnesses of the hard portions 64A and the soft portion 64B are made to be the same hardnesses, and the absorber 50 is structured to have one type of hardness. Further, the absorber 50 may be structured to have three or more types of hardnesses. For example, the absorber main portion 52, the absorber side portions 54, and the absorber side projecting portions 60 respectively may be structured to have different hardnesses, and the absorber 50 may be structured to have three types of hardnesses.

Moreover, in the present embodiment, the entire absorber side portion 54 is structured by the hard portion 64A, but a portion of the absorber side portion 54 may be structured by the hard portion 64A. For example, as with the range indicated by arrow A in FIG. 3, the portion, that is adjacent to the supporting member 30, of the absorber side portion 54 may be structured by the soft portion 64B, and the front portion only of the absorber side portion 54 may be structured by the hard portion 64A. In this case, load toward the vehicle rear side is transmitted from the hard portion 64A to the soft portion 64B, and the pressure tube 72 may be deformed.

Further, in the present embodiment, an example is illustrated in which the vehicle bumper structure S that is equipped with the pedestrian collision detection sensor 70 is applied to the front bumper 12, but the present invention is not limited to this. For example, the above-described respective structures may be reversed front-and-rear, and the vehicle bumper structure S that is equipped with the pedestrian collision detection sensor 70 may be applied to a rear bumper.

The invention claimed is:

1. A vehicle bumper structure for a vehicle, the vehicle bumper structure comprising:
  a bumper reinforcement that is disposed with a vehicle transverse direction being a length direction thereof;
  an absorber that extends in the vehicle transverse direction, and that is disposed adjacent to a vehicle front direction side of the bumper reinforcement;
  a pedestrian collision detection sensor that includes a pressure tube extending in the vehicle transverse direction between the bumper reinforcement and the absorber, the pedestrian collision detection sensor being configured to output a signal corresponding to a change in pressure of the pressure tube; and
  supporting members that are structurally separate from the bumper reinforcement, and that extend from both vehicle transverse direction end portions of the bumper reinforcement toward vehicle transverse direction outer sides of the vehicle and toward a rear of the vehicle as seen in plan view, the supporting members being disposed adjacent to a vehicle rear direction side of the absorber and of the pressure tube,
  wherein the absorber includes a holding portion that holds the pressure tube at the absorber, and
  absorber side projecting portions are formed at both of the vehicle transverse direction end portions of the absorber, the absorber side projecting portions projecting toward the rear of the vehicle with respect to the distal ends of the supporting members and extending in a vehicle longitudinal direction.

2. The vehicle bumper structure of claim 1, wherein both vehicle transverse direction end portions of the absorber and both vehicle transverse direction end portions of the pressure tube are disposed farther toward the vehicle transverse direction outer sides of the vehicle than distal ends of the supporting members.

3. The vehicle bumper structure of claim 2, wherein:
  pressure tube side projecting portions are formed at both the vehicle transverse direction end portions of the pressure tube, the pressure tube side projecting portions extending in the vehicle longitudinal direction along the absorber side projecting portions.

4. The vehicle bumper structure of claim 1, wherein:
  the supporting members include curved surfaces that are disposed farther toward a front of the vehicle than both of the vehicle transverse direction end portions of the bumper reinforcement, and
  the curved surfaces are curved toward the front of the vehicle and form surfaces that are continuous with a vehicle front direction surface of the bumper reinforcement as seen in plan view.

5. A vehicle bumper structure for a vehicle, the vehicle bumper structure comprising:
  a bumper reinforcement that is disposed with a vehicle transverse direction being a length direction thereof;
  an absorber that extends in the vehicle transverse direction, and that is disposed adjacent to a vehicle front direction side of the bumper reinforcement;
  a pedestrian collision detection sensor that includes a pressure tube extending in the vehicle transverse direction between the bumper reinforcement and the absorber, the pedestrian collision detection sensor being configured to output a signal corresponding to a change in pressure of the pressure tube; and
  supporting members that are structurally separate from the bumper reinforcement, and that extend from both vehicle transverse direction end portions of the bumper reinforcement toward vehicle transverse direction outer sides of the vehicle and toward a rear of the vehicle as seen in plan view, the supporting members being disposed adjacent to a vehicle rear direction side of the absorber and of the pressure tube, wherein
  the absorber includes a holding portion that holds the pressure tube at the absorber,
  the supporting members are made of resin, and
  the supporting members include ribs that are formed integrally therewith and have a plate thickness direction in a vehicle vertical direction.

6. The vehicle bumper structure of claim 1, wherein the bumper reinforcement is formed as a closed cross-sectional structure that opens toward both vehicle transverse direction outer sides of the vehicle, and the supporting members include fit-together portions that project toward a vehicle transverse direction inside of the vehicle, and the supporting members are assembled to the bumper reinforcement by fitting the fit-together portions to the closed cross-section of the bumper reinforcement.

7. A vehicle bumper structure for a vehicle, the vehicle bumper structure comprising:
  a bumper reinforcement that is disposed with a vehicle transverse direction being a length direction thereof;
  an absorber that extends in the vehicle transverse direction, and that is disposed adjacent to a vehicle front direction side of the bumper reinforcement;
  a pedestrian collision detection sensor that includes a pressure tube extending in the vehicle transverse direction between the bumper reinforcement and the absorber, the pedestrian collision detection sensor being configured to output a signal corresponding to a change in pressure of the pressure tube; and
  supporting members that are structurally separate from the bumper reinforcement, and that extend from both vehicle transverse direction end portions of the bumper reinforcement toward vehicle transverse direction outer sides of the vehicle and toward a rear of the vehicle as seen in plan view, the supporting members being disposed adjacent to a vehicle rear direction side of the absorber and of the pressure tube, wherein
  the absorber includes a holding portion that holds the pressure tube at the absorber, slits that open toward a vehicle transverse direction inside of the vehicle are formed in the supporting members at positions between the fit-together portions and the curved surfaces, and in a state in which the supporting members are assembled to the bumper reinforcement, a wall of the bumper reinforcement is fitted into the slits.

8. The vehicle bumper structure of claim 1, wherein the absorber and the pressure tube are disposed adjacent to a vehicle front direction side of an upper portion of the bumper reinforcement.

9. The vehicle bumper structure of claim 1, wherein:
a bumper cover is provided at a vehicle front direction side of the absorber,
the pedestrian collision detection sensor has pressure detectors that output signals corresponding to changes in pressure within the pressure tube, and
the pressure detectors are fixed to vehicle side members that are made of metal and are disposed at a vehicle rear direction side of the bumper cover.

10. A vehicle bumper structure o for a vehicle, the vehicle bumper structure comprising:
a bumper reinforcement that is disposed with a vehicle transverse direction being a length direction thereof;
an absorber that extends in the vehicle transverse direction, and that is disposed adjacent to a vehicle front direction side of the bumper reinforcement;
a pedestrian collision detection sensor that includes a pressure tube extending in the vehicle transverse direction between the bumper reinforcement and the absorber, the pedestrian collision detection sensor being configured to output a signal corresponding to a change in pressure of the pressure tube; and
supporting members that are structurally separate from the bumper reinforcement, and that extend from both vehicle transverse direction end portions of the bumper reinforcement toward vehicle transverse direction outer sides of the vehicle and toward a rear of the vehicle as seen in plan view, the supporting members being disposed adjacent to a vehicle rear direction side of the absorber and of the pressure tube, wherein
the absorber includes a holding portion that holds the pressure tube at the absorber, and
a thickness of portions of the absorber that are disposed adjacent to the supporting members is thinner than a thickness of a portion of the absorber that is disposed adjacent to the bumper reinforcement.

11. The vehicle bumper structure of claim 1, wherein a hardness of at least portions of the absorber that are disposed adjacent to the supporting members is higher than a hardness of other portions of the absorber.

12. The vehicle bumper structure of claim 11, wherein, as seen in plan view, border surfaces of the absorber of different hardnesses are disposed farther toward a vehicle transverse direction inside of the vehicle than both vehicle transverse direction ends of the bumper reinforcement, the border surfaces being inclined toward the vehicle transverse direction inside of the vehicle on progression toward a front of the vehicle.

13. The vehicle bumper structure of claim 11, wherein, as seen in plan view, border surfaces of the absorber of different hardnesses are disposed so as to overlap both vehicle transverse direction ends of the bumper reinforcement in a vehicle longitudinal direction, the border surfaces being inclined toward a vehicle transverse direction inside of the vehicle on progression toward a front of the vehicle.

14. The vehicle bumper structure of claim 1, wherein:
a hardness of at least the absorber side projecting portions is set to be higher than a hardness of other regions of the absorber, and
as seen in plan view, border surfaces of the absorber of different hardnesses are disposed so as to overlap the distal ends of the supporting members in the vehicle transverse direction, the border surfaces being inclined toward vehicle transverse direction outer sides of the vehicle on progression toward a front of the vehicle.

15. The vehicle bumper structure of claim 11, wherein the absorber is structured from foamed materials having different foam proportions.

16. The vehicle bumper structure of claim 1, wherein the holding portion is a groove formed in the absorber.

17. The vehicle bumper structure of claim 16, wherein the groove is formed in a vehicle rear direction side of the absorber.

18. The vehicle bumper structure of claim 16, wherein the groove has a C-shape, when viewed in cross-section, that opens toward the rear of the vehicle.

19. The vehicle bumper structure of claim 16, wherein the groove extends in the vehicle transverse direction.

* * * * *